United States Patent
Yoshii

(10) Patent No.: US 7,174,128 B2
(45) Date of Patent: Feb. 6, 2007

(54) RADIO COMMUNICATION SYSTEM AND RADIO COMMUNICATION METHOD

(75) Inventor: Isamu Yoshii, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 699 days.

(21) Appl. No.: 10/344,570

(22) PCT Filed: Jul. 2, 2002

(86) PCT No.: PCT/JP02/06668

§ 371 (c)(1),
(2), (4) Date: Feb. 13, 2003

(87) PCT Pub. No.: WO03/005758

PCT Pub. Date: Jan. 16, 2003

(65) Prior Publication Data

US 2004/0005882 A1    Jan. 8, 2004

(30) Foreign Application Priority Data

Jul. 3, 2001   (JP) .............................. 2001-202527

(51) Int. Cl.
H04B 7/185   (2006.01)
(52) U.S. Cl. .................... 455/13.1; 455/63.2; 455/510; 455/450; 455/512
(58) Field of Classification Search ............ 455/575.3, 455/450–455, 11.1, 510–516, 552.1, 553.1, 455/502, 13.1–13.3, 63.2, 553; 714/749; 379/229–238, 322, 329, 352–356, 395.2–395.43, 379/100.09, 152, 317
See application file for complete search history.

(56) References Cited

U.S. PATENT DOCUMENTS

| | | | | |
|---|---|---|---|---|
| 4,882,765 A | * | 11/1989 | Maxwell et al. | ............... 455/18 |
| 4,888,767 A | * | 12/1989 | Furuya et al. | ............... 370/243 |
| 5,699,367 A | * | 12/1997 | Haartsen | ..................... 714/749 |
| 5,940,769 A | * | 8/1999 | Nakajima et al. | ........... 455/509 |
| 2002/0049068 A1 | * | 4/2002 | Koo et al. | ................... 455/522 |
| 2005/0063356 A1 | * | 3/2005 | Larsen et al. | ................ 370/351 |

FOREIGN PATENT DOCUMENTS

| | | |
|---|---|---|
| JP | 57166746 | 10/1982 |
| JP | 01300720 | 12/1989 |
| JP | 06045991 | 2/1994 |
| JP | 07200505 | 8/1995 |

(Continued)

OTHER PUBLICATIONS

International Search Report dated Oct. 15, 2002.
Japanese Office Action dated Mar. 29, 2005 with English translation.

*Primary Examiner*—Duc M. Nguyen
*Assistant Examiner*—Eric J Elcenko
(74) *Attorney, Agent, or Firm*—Stevens, Davis, Miller & Mosher, LLP

(57) ABSTRACT

In a service area of base station 101 is provided at least one relay station 102 that executes processing for non real time data repeat request from communication terminal 103 as a substitute for base station 101, thereby removing the processing for non real time data repeat from base station 101. Thus, processing loads on base station 101 are reduced and the transmission efficiency is improved over the entire system, whereby it is possible to increase the number of communication terminals that base station 101 handles.

6 Claims, 6 Drawing Sheets

FOREIGN PATENT DOCUMENTS

| | | |
|---|---|---|
| JP | 08186528 | 7/1996 |
| JP | 08251658 | 9/1996 |
| JP | 10066138 | 3/1998 |
| JP | 2000 134668 | 5/2000 |
| JP | 2000 217157 | 8/2000 |
| JP | 2001 007762 | 1/2001 |
| JP | 2001 077737 | 3/2001 |

* cited by examiner

Srt:Slots for Real Time Data
Snrt:Slots for Non Real Time Data

RADIO COMMUNICATION SYSTEM AND RADIO COMMUNICATION METHOD

TECHNICAL FIELD

The present invention relates to a radio communication system and radio communication method.

BACKGROUND ART

Conventionally, in radio communication systems cellular systems are used widely in which a service area of a single base station is about a few kilometers and a plurality of base stations are disposed. Further, in order to increase the number of users accommodated in a base station, the number of base stations is increased to reduce a service area per base station.

Recently, with the widespread of the internet, i mode (that is a registered trademark of NTT DoCoMo, Inc.) and so on, distribution services of image and speech information have been performed increasingly, and the data amount that a base station handles dramatically increase. The data that base stations handle includes real time data that does not permit a delay and non real time data that permits a delay. An example of the real time data is speech data, and an example of the non real time data is image data with less motion such as a background image.

However, in the conventional radio communication systems, although it is possible to increase the user capacity by reducing the service area of a base station, there is still a problem that it is difficult to greatly increase the user capacity, due to increases in control load caused by increases in data that a base station handles, in addition to increases in frequency of handover.

DISCLOSURE OF INVENTION

It is an object of the present invention to provide a radio communication system and radio communication method enabling increased user capacity even when control loads are increased due to increases in data that base stations handle The object is achieved by providing in a service area of a base station at least one relay station that executes processing for non real time data repeat requests from communication terminals as a substitute for the base station, removing the processing associated with the non real time data repeat from the base station to reduce processing loads on the base station, and increasing the transmission efficiency over the entire system.

BEST MODE FOR CARRYING OUT THE INVENTION

Embodiments of the present invention will be described below specifically with reference to accompanying drawings.

(First Embodiment)

Figure 1:
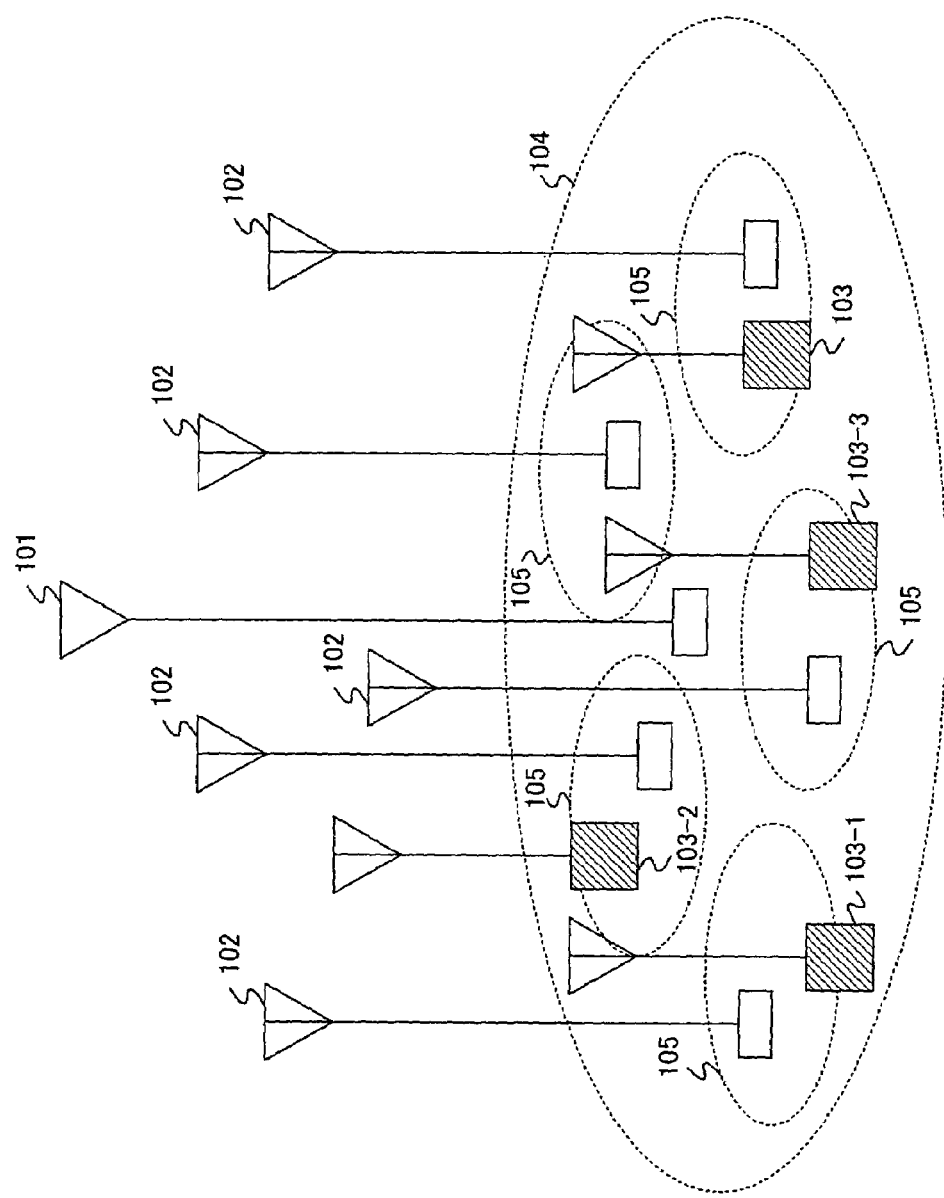
FIG. 1 is a diagram illustrating a configuration of a radio communication system according to a first embodiment of the present invention.

FIG. 1 is a diagram illustrating a configuration of a radio communication system according to the first embodiment of the present invention. The radio communication system of this embodiment is comprised of base station 101, relay station 102 and communication terminals 103 and 103-1 to 103-3. In addition, for convenience of explanation, only communication terminal 103 is used as a communication terminal for explanation.

Base station 101 controls communications with communication terminal 103 present in cell 104 that is the service area. Data that base station 101 handles includes real time data that does not permit a delay and non real time data that permits a delay. Base station 101 transmits and receives the real time data as appropriate when necessary, while hardly retransmitting the non real time data, and when receiving a repeat request from communication terminal 103, adds the repeat to scheduling of non real time data. In addition, as described above, an example of the real time data is speech data, and an example of the non real time data is image data with less motion such as a background image.

At least one relay station 102 is disposed in cell 104 of base station 101, and performs repeat control of non real time data to communication terminal 103 present in service area 105. In other words, whenever base station 101 that covers relay station 102 transmits non real time data, the station 102 stores the data in its memory, and when receiving a repeat request from communication terminal 103, transmits stored non real time data to communication terminal 103. In addition, relay station 102 holds non real time data during a non real time data holding period, i.e., a period during which non real time data is received and then abandoned.

When receiving data transmitted from base station 101, communication terminal 103 performs processing based on the data when the received data meets the predetermined communication quality, while transmitting a repeat request when the data does not meet the quality. In this case, as described above, since base station 101 hardly performs the repeat control of non real time data, relay station 102 that receives the repeat request from communication terminal 103 performs the repeat of non real time data as a substitute for base station 101. In this way, communication terminal 103 obtains the non real time data from relay station 102 that covers a current position of the terminal 103.

Figure 2:
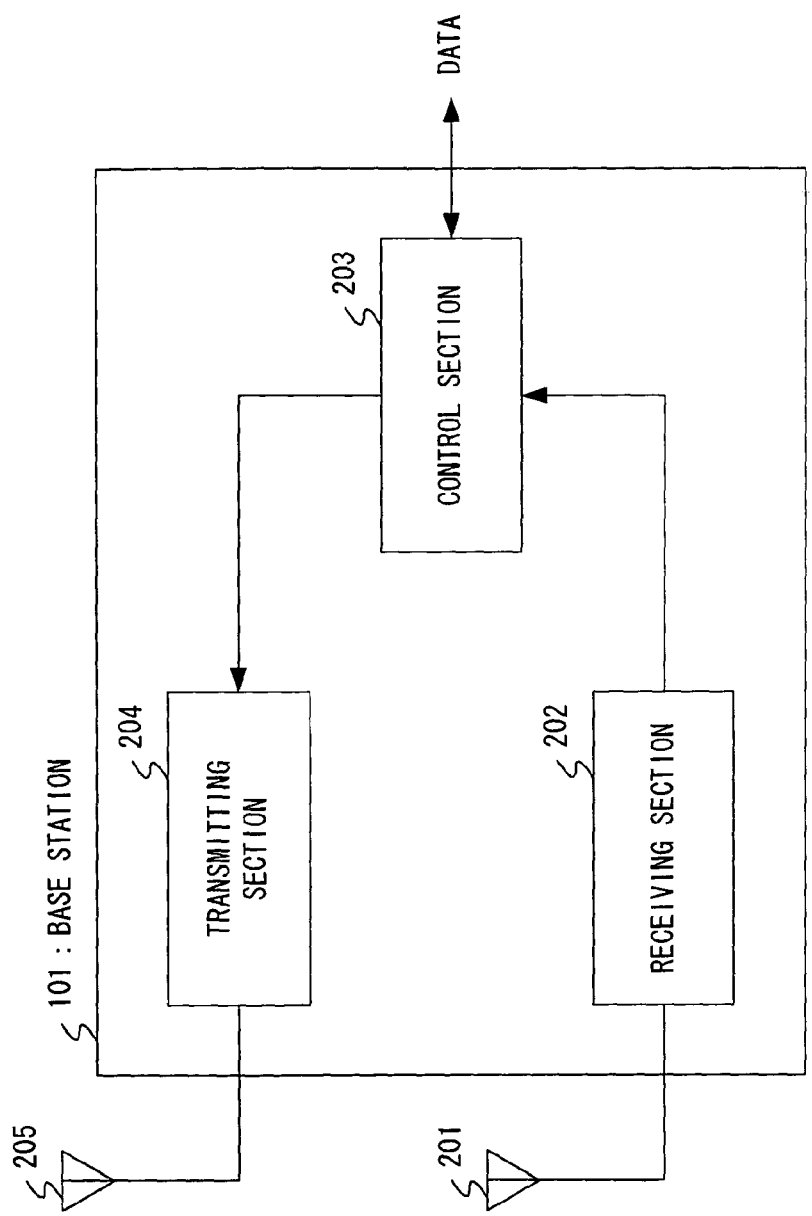
FIG. 2 is a block diagram illustrating a configuration of a base station according to the first embodiment of the present invention.

FIG. 2 is a block diagram illustrating a configuration of base station 101. In this figure, base station 101 is comprised of antenna 201, receiving section 202, control section 203, transmitting section 204 and antenna 205.

In such a configuration, control section 203 fetches data transmitted in wireless or wired communications from a base station control apparatus (not shown) that is an upper apparatus than base station 101, and inputs the data to transmitting section 204. Further, the section 203 determines whether the data transmitted from the base station control apparatus is real time data or non real time data, and based on the result, controls transmitting section 204. Transmitting section 204 performs predetermined modulation processing on the data input from control section 203 to generate a modulation signal, and transmits the signal from antenna 205. In this case, by control of control section 203, the data to transmit is transmitted to only communication terminal 103, or both relay station 102 and communication terminal 103. In other words, when the data to transmit is real time data, the data is transmitted to only communication terminal 103, and when the data to transmit is non real time data, the data is transmitted to both relay station 102 and communication terminal 103.

Meanwhile, a signal transmitted from communication terminal 103 is input to receiving section 202 via antenna 201. Receiving section 202 performs predetermined demodulation processing on the input radio signal to generate a demodulated signal, and inputs the signal to control section 203. Based on the demodulated signal input from receiving section 202, control section 203 determines whether the signal is real time data or repeat request signal from communication terminal 103, and when determining the signal is real time data, outputs the data to the base station control apparatus (not shown). When determining the signal is the repeat request signal, the section 203 performs scheduling using the repeat data as one of the non real time data, and transmits the repeat data to communication terminal 103 via transmitting section 204. By having such a function, when relay station 102 cannot transmit the repeat data (when the non real time data stored in the relay station is abandoned due to time-out), communication terminal 103 transmits a repeat request to base station 101, and base station 101 retransmits the data, whereby it is possible to assure repeat of non real time data.

Further, when receiving a command (modulation scheme request command) for requesting a desired modulation scheme in communication terminal 103 transmitted from the terminal 103, control section 203 controls transmitting section 204 to set a requested modulation scheme, and transmitting section 204 transmits signals to communication terminal 103.

Transmission slots in base station 101 will be described below with reference to FIG. 3.

Figure 3:
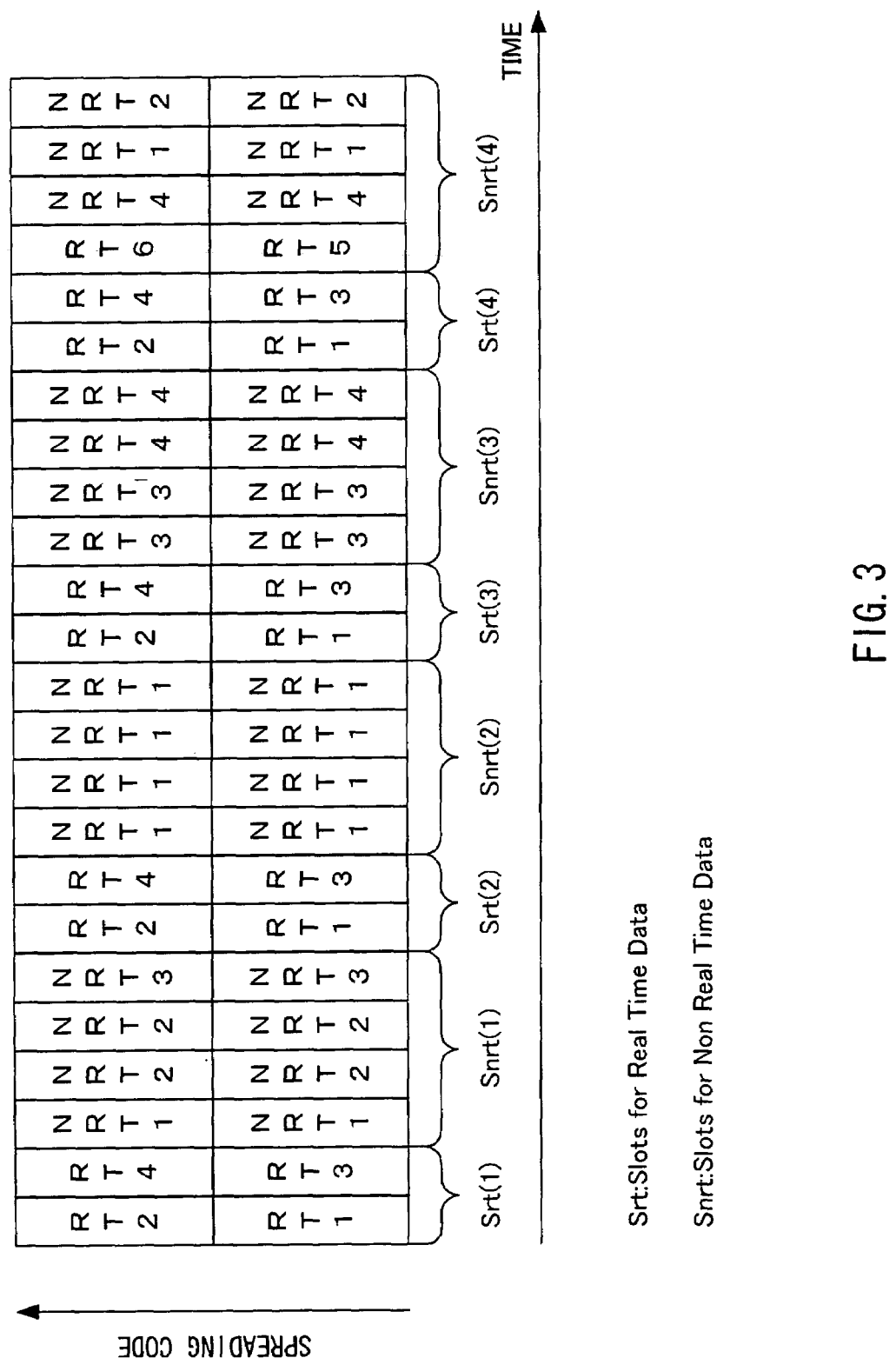
FIG. 3 is a diagram illustrating an example of transmission slot use situation in the base station according to the first embodiment of the present invention.

FIG. 3 is a diagram illustrating an example of transmission slot use situation in the base station according to the first embodiment of the present invention. In this figure, the vertical axis indicates type of spreading code, and the horizontal axis indicates time. "RT" indicates real time data, "NRT" indicates non real time data, and a number assigned to "RT" or "NRT" indicates a user. "Srt" (Slots for Real Time Data) is slots used for real time data, and is an interval at which real time data is transmitted. "Snrt" (Slots for Non Real Time Data) is slots used for non real time data, and is an interval at which non real time data is transmitted.

In "Srt" a single user is assigned a single spreading code, while in "Snrt" a single user is assigned a plurality of spreading codes. In other words, in "Srt" multi-user multiplexing is performed in which a plurality of users is multiplexed, while in "Snrt" single-user communications are performed in which signals are transmitted to only a single user. Further, "Snrt(4)" indicates it possible to assign real time data to non-real time data slots. Meanwhile, it is also possible to retransmit non real time data in "Srt", and when retransmitting the data, the scheduling is performed similarly to other real time data. In addition, while in FIG. 3 two types of spreading codes are indicated, it may be possible to arbitrarily set the number of spreading codes at N (N is an arbitrary positive number).

Figure 4:
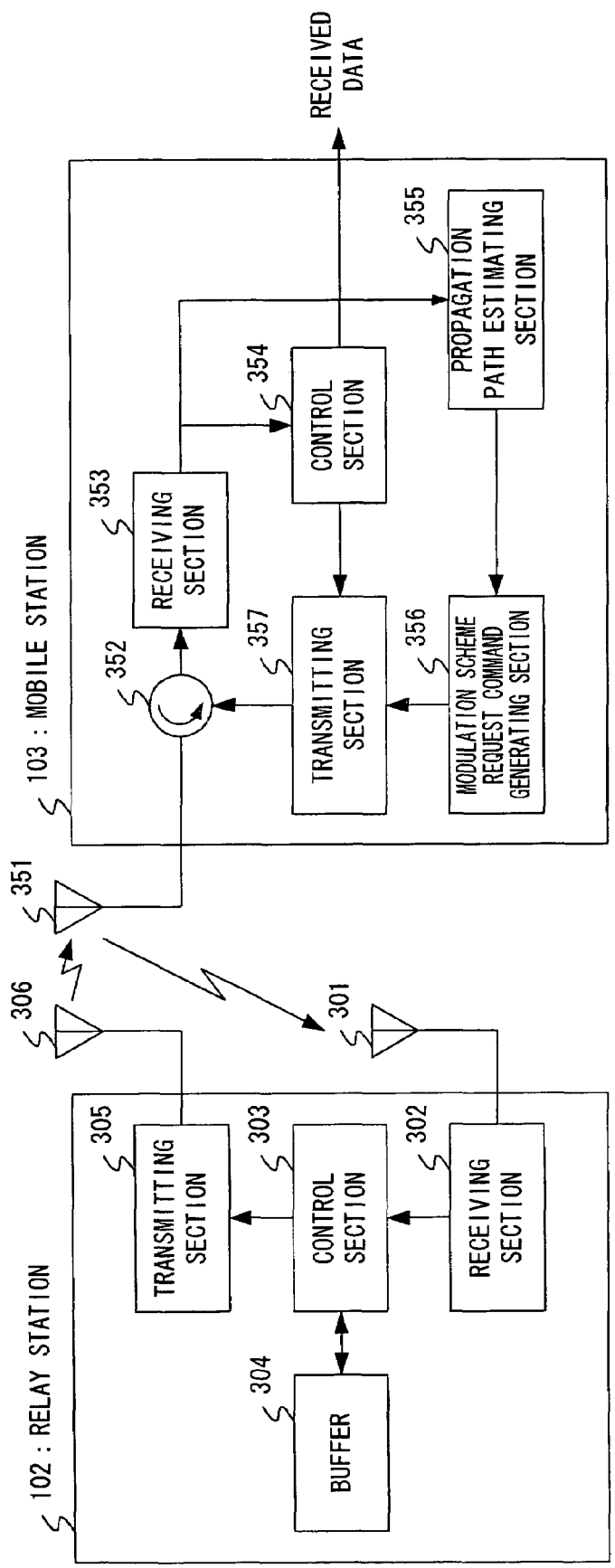
FIG. 4 is a block diagram illustrating configurations of a relay station and communication terminal according to the first embodiment of the present invention.

Next, FIG. 4 is a block diagram illustrating configurations of relay station 102 and communication terminal 103.

In this figure, relay station 102 is comprised of antenna 301, receiving section 302, control section 303, buffer 304, transmitting section 305 and antenna 306.

In such a configuration, a signal transmitted from base station 101 or communication terminal 103 is input to receiving section 302 via antenna 301. Receiving section 302 performs predetermined demodulation processing on the input radio signal to generate a demodulated signal, and inputs the signal to control section 303. Control section 303 determines whether the received signal is non real time data or repeat request signal, and when determining the signal is the non real time data, stores the data in buffer 304 and deletes the data after a lapse of predetermined time. In this way, it is possible to effectively use the limited buffer that the relay station has. Meanwhile, when determining that the data is the repeat request data, the section 303 reads data currently stored in buffer 304 to input to transmitting section 305. Transmitting section 305 performs the predetermined modulation processing on the input non real time data to generate a modulated signal, and transmits the signal to communication terminal 103 through antenna 306.

When receiving a modulation scheme request command transmitted from communication terminal 103, control section 303 controls transmitting section 305 to set a requested modulation scheme, and transmitting section 305 transmits signals to communication terminal 103.

Meanwhile, communication terminal 103 is comprised of antenna 351, circulator 352, receiving section 353, control section 354, propagation path estimating section 355, modulation scheme request command generating section 356 and transmitting section 357.

In such a configuration, a signal transmitted from base station 101 or relay station 102 is input to receiving section 353 through antenna 351 and circulator 352 sequentially. Receiving section 353 performs the predetermined demodulation processing on the input radio signal to generate a demodulated signal, and inputs the signal to control section 354 and propagation path estimating section 355. Control section 354 makes a decision on errors on the demodulated signal input from receiving section 353. When any error is not detected and the communication quality is assured, the section 354 inputs the signal transmitted from base station 101 or relay station 102 as received data. Meanwhile, when an error is detected and the communication quality is not assured, the section 354 generates a repeat request signal to input to transmitting section 357. Propagation path estimating section 355 estimates propagation path environments from the signal input from receiving section 353, determines an optimal modulation scheme, and inputs the result to modulation scheme request command generating section 356. The determination on modulation scheme will be described later.

Modulation scheme request command generating section 356 generates a command for requesting a modulation scheme determined in propagation path estimating section 355 to relay station 102, and inputs the command to transmitting section 357. Transmitting section 357 modulates the repeat request signal generated in control section 354 and the command generated in modulation scheme request command generating section 356, amplifies the resultant to predetermined power, and transmits the signal to relay station 102 through circulator 352 and antenna 351 sequentially. In this case, communication terminal 103 uses initially set power (transmission power such that a signal reaches at least one relay station at the time of starting to transmit a repeat request signal) when making a repeat request to relay station 102, and increases the transmission power stepwise every time the repeat request is repeated. Further, it may be possible to increase the transmission power of a repeat request corresponding to (for example, in inversely proportional to) a time remaining until relay station 102 abandons the non real time data. It is thereby possible to start transmitting a repeat request signal to the relay station with the minimum transmission power that does not cause interference with other communication terminals. Further, when the transmission power of a repeat request signals is low and the relay station does not recognize the repeat request signal due to deterioration of propagation environments or the like, it is possible to make a repeat request with transmission power hardly affected by interference on propagation path, and to enhance the possibility that the relay station receives the repeat request signal.

Figure 5:
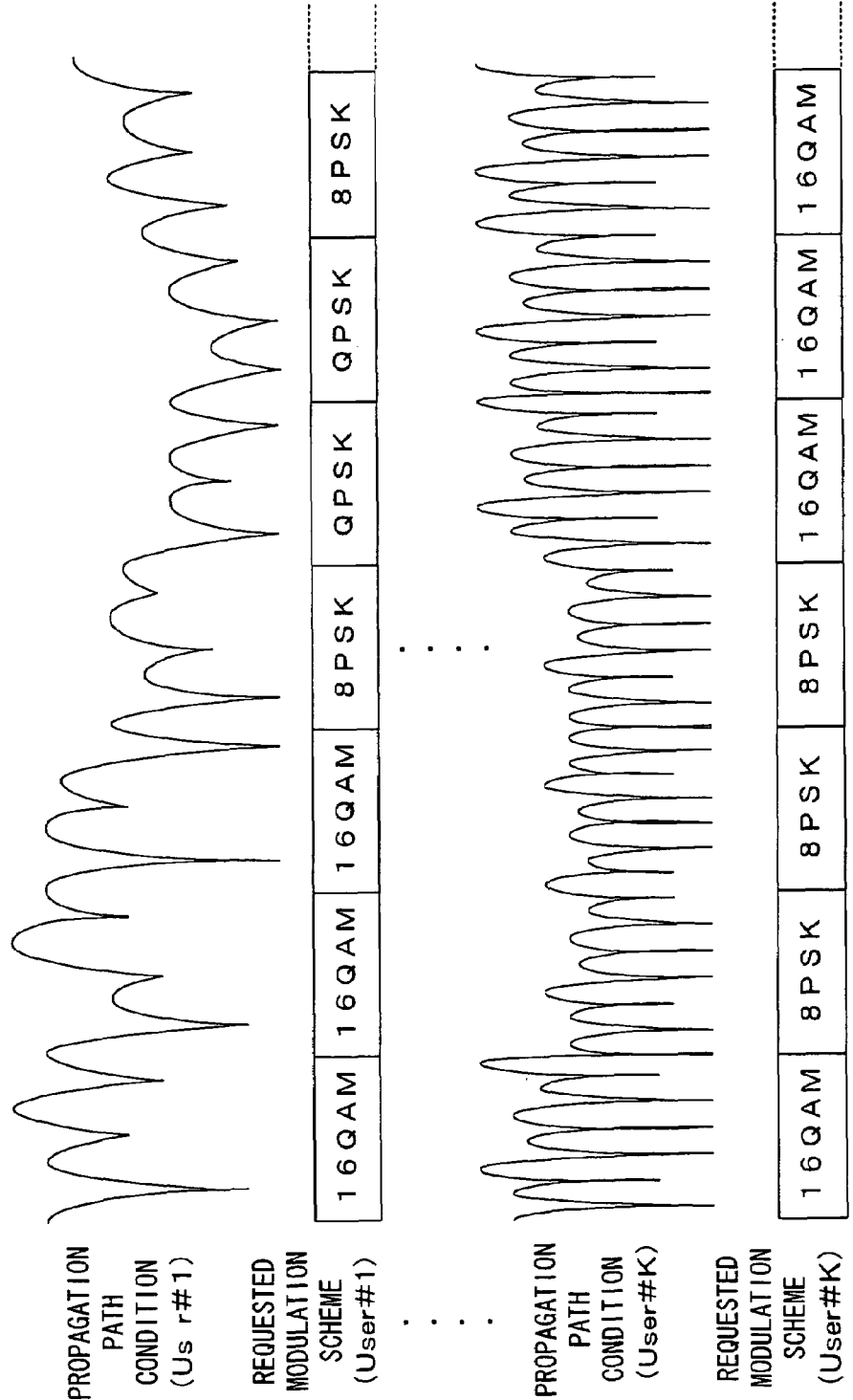
FIG. 5 is a schematic diagram illustrating modulation scheme determination in the communication terminal according to the first embodiment of the present invention.

FIG. 5 is a schematic diagram illustrating a modulation scheme determination in the communication terminal according to the first embodiment of the present invention.

This figure illustrates propagation path conditions and modulation scheme determinations on users 1 and K. Since propagation paths are different between users 1 and K, as illustrated in the figure, propagation path conditions are also different. Therefore, each communication terminal determines a modulation scheme corresponding to the propagation path condition, and requests the modulation scheme to base station 101 in communications or relay station 102. In other words, 16QAM is used when the propagation path condition is the most excellent, while 8PSK and QPSK are used when the propagation path condition deteriorates.

Figure 6:
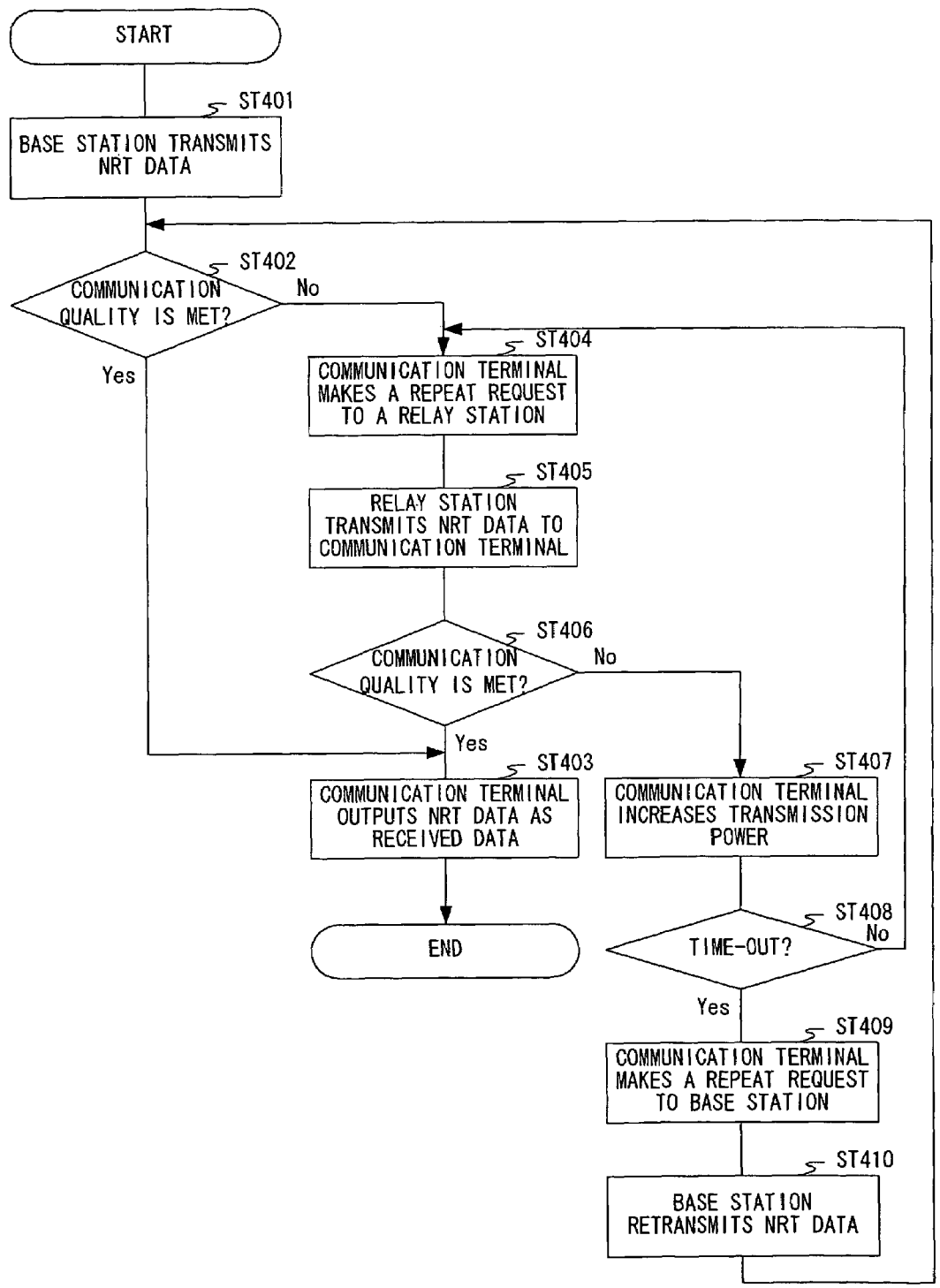
FIG. 6 is a flow diagram illustrating processing for transmitting non real time data in the radio communication system according to the first embodiment of the present invention.

FIG. 6 is a flow diagram indicating processing for transmitting non real time data in the radio communication system according to the first embodiment of the present invention.

First, in step (hereinafter abbreviated as "ST") 401, base station 101 transmits non real time data ("NRT data" in FIG. 6) to all relay station 102 and communication terminal 103 in cell 104 that is the service area of base station 101. In ST402, communication terminal 103 determines whether the data transmitted from base station 101 meets the predetermined communication quality, and when determining that the data meets the predetermined communication quality, in ST403, processes the non real time data transmitted from base station 101 as the received data. On the contrary, when determining that the data does not meet the predetermined communication quality, in ST404, makes a repeat request to relay station 102.

Next, in ST405, relay station 102 transmits the non real time data subject to the repeat to communication terminal 103. In ST406, communication terminal 103 determines whether the data transmitted from relay station 102 meets the predetermined communication quality. In addition, the determination in ST406 is the same as that in ST402, and when the data transmitted from relay station 102 meets the predetermined communication quality, the processing flow proceeds to ST403. When the data does not meet the predetermined communication quality, in ST407 communication terminal 103 increases the transmission power of the repeat request. When the non real time data stored in the relay station does not reach the time-out in ST408, the processing flow returns to ST404. When the data reaches the time-out, in ST409 communication terminal 103 makes a repeat request to base station 101. Base station 101 retransmits the non real time data in ST410, and the processing flow returns to ST402.

As described above, according to this embodiment, a service area of base station 101 is provided with at least one relay station 102 that executes processing for non real time data repeat requests from communication terminal 103 as a substitute for base station 101, and the processing associated with the non real time data repeat is removed from base station 101. In this way, processing loads on base station 101 are reduced, and the transmission efficiency increases over the entire system. It is thereby possible to increase the number of communication terminals that base station 101 handles. In other words, it is possible to increase the user capacity.

(Second Embodiment)

A radio communication system according to the second embodiment of the present invention has the function as described below. In addition, the radio communication system according to this embodiment has the same configuration as that of the radio communication system in the first embodiment except the new function, and FIGS. 1, 2 and 4 are referred to.

Communication terminal 103 in the radio communication system according to this embodiment determines relay station 102 that performs the repeat, based on an identification signal transmitted from each of a plurality of relay stations 102. In this case, the identification signal is a signal for specifying relay station 102. In this way, based on the identification signal transmitted from each of a plurality of relay stations 102, communication terminal 103 is capable of recognizing relay station 102 that provides the most excellent communication quality. Therefore, since it is possible for the base station to select a relay station that provides excellent quality of communications with the communication terminal, the possibility is increased that the communication terminal is capable of receiving non real time data at the time of the repeat.

Further, when communication terminal 103 makes a repeat request a plurality of times due to rapid deterioration of propagation environments or the like, the terminal 103 makes a repeat request repeatedly to the same relay station 102. In addition, when making a repeat request a plurality of times, there is a method for making a repeat request to relay station 102 with the second excellent communication quality, instead of making a repeat request to relay station 102 to which the first repeat request is made. In addition, when communication terminal 103 makes a repeat request after a lapse of predetermined time, base station 101 retransmits data.

Increases in frequency of hand over will be described which is expected due to decreased area size caused by providing relay station 102.

Handover in non real time communications includes handover under control of base station and handover under control of relay station. In this embodiment, when base station 101 that manages communication terminal 103 is changed, handover is performed under control of base station. When relay station 102 that manages communication terminal 103 is changed due to movement in the same cell, handover under control of relay station is not performed basically. In other words, the same non real time data is distributed to all the relay stations in the same cell, and communication terminal 103 is capable of receiving the same non real time data in a destination of the movement. Accordingly, it is not necessary to consider handover caused by providing relay station 102.

As described above, according to this embodiment, since communication terminal 103 receives retransmitted non real time data from relay station 102 with the most excellent communication quality, the possibility is high that the non real time data meets the predetermined communication quality, and it is thereby possible to reduce the frequency of making a repeat request.

(Third Embodiment)

A radio communication system according to the third embodiment of the present invention has the function as described below. In addition, the radio communication system according to this embodiment has the same configuration as that of the radio communication system in the first embodiment except the new function, and FIGS. 1, 2 and 4 are referred to.

Communication terminal 103 does not make a repeat request to specific relay station 102, and makes a repeat request to all relay stations 102 present in a range in which signals reach. Then, among items of non real time data transmitted from a plurality of relay stations that receives the repeat request, the terminal 103 selects an item of the data with the most excellent communication quality. Thus, even when errors occur on some propagation paths, the possibility is high that the non real time data meets the predetermined communication quality, and it is possible to decrease the frequency that communication terminal makes a repeat request. In this case, since the area of relay station 102 is small, even when a plurality of relay stations 102 performs the repeat concurrently, their delayed versions do not interfere with one another.

When communication terminal 103 makes a repeat request a plurality of times, as in the first repeat request, communication terminal 103 makes a repeat request to all relay stations 102 present in a range in which signals reach, and receives the repeat data again from the plurality of relay stations 102 concurrently. However, when communication terminal 103 makes a repeat request after a lapse of predetermined time, base station 101 performs the repeat. In addition, handover is the same as in the second embodiment, and descriptions thereof are omitted.

As described above, according to this embodiment, since communication terminal 103 selects an item with the most excellent communication quality among items of the same non real time data transmitted from a plurality of relay stations 102, even when errors occur on some propagation paths, the possibility is high that the non real time data meets the predetermined communication quality, and it is thereby possible to reduce the frequency of making a repeat request.

(Fourth Embodiment)

A radio communication system according to the fourth embodiment of the present invention has the function as described below. In addition, the radio communication system according to this embodiment has the same configuration as that of the radio communication system in the first embodiment except the new function, and FIGS. 1, 2 and 4 are referred to.

Some relay stations 102 that receive a repeat request from communication terminal 103 report to base station 101 propagation environments at the time of receiving the repeat request, and based on the reports, base station 101 determines a relay station 102 that performs the repeat. Then, base station 101 instructs the relay station 102 to transmit the non real time data to communication terminal 103. The processing required for base station 101 to determine a relay station can be executed with extremely less load than the processing for performing the repeat. In this way, base station 101 determines relay station 102 with the most excellent propagation environments between communication terminal 103 and relay station 102, and determined relay station 102 transmits the non real time data to communication terminal 103. Therefore, the possibility is high that communication terminal 103 receives non real time data meeting the predetermined communication quality, and it is possible to decrease the frequency of making a repeat request. However, when communication terminal 103 makes a repeat request after a lapse of predetermined time, base station 101 retransmits data. In addition, handover is the same as in the second embodiment.

As described above, according to this embodiment, based on propagation environments between relay station 102 and communication terminal 103, base station 101 determines relay station 102 that transmits repeat data, whereby the possibility is high that communication terminal 103 receives non real time data meeting the predetermined communication quality, and it is possible to decrease the frequency of making a repeat request.

In addition, the relay station in each of the above-mentioned embodiments executes only the repeat processing, and may be provided with a count section that counts the number of repeats, and a storage section that stores the count in the count section, so as to charge corresponding to the number of repeats or the like. In such a configuration, it is possible to set relay stations optionally to use for business aims.

In each of the above-mentioned embodiments, the premise is a CDMA (Code Division Multiple Access) system, but the present invention is also applicable to a TDMA (Time Division Multiple Access) system and an FDMA (Frequency Division Multiple Access) system.

As described above, according to the present invention, it is possible to provide a radio communication system and radio communication method enabling increased user capacity, by providing in a service area of a base station at least one relay station that executes processing for non real time data repeat requests from communication terminals as a substitute for the base station, removing the processing associated with the non real time data repeat from the base station to reduce processing loads on the base station, and increasing the transmission efficiency over the entire system.

This application is based on the Japanese Patent Application No. 2001-202527 filed on Jul. 3, 2001, entire content of which is expressly incorporated by reference herein.

INDUSTRIAL APPLICABILITY

The present invention is suitable for use in a radio communication system and radio communication method.

The invention claimed is:

1. A radio communication system comprising:
   a base station that transmits both real-time data and non-real-time data;
   a relay station that receives and stores the non-real-time data; and
   a communication terminal that receives both the real-time data and non-real-time data, wherein in retransmission:
   the real-time data is retransmitted from the base station to the communication terminal, and the non-real-time data is retransmitted from the relay station to the communication terminal, and
   the base station assigns the real-time data to a non-real-time data slot.

2. The radio communication system according to claim 1, wherein the base station transmits the real-time data to the communication terminal, alone, and transmits the non-real-time data to both the relay station and the communication terminal.

3. The radio communication system according to claim 1, wherein in a real-time data transmission period, the base station code division multiplexes real-time data for a plurality of communication terminals.

4. The radio communication system according to claim 1, wherein in a non-real-time data transmission period, the base station code division multiplexes non-real-time data for a single communication terminal.

5. The radio communication system according to claim 1, wherein the communication terminal increases the transmission power of a repeat request signal according to the time remaining until the non-real-time data stored in the relay station is abandoned.

6. A radio communication method comprising a base station transmitting both real-time data and non-real-time data, a relay station receiving and storing the non-real-time data, and a communication terminal receiving both the real-time data and non-real-time data, wherein in retransmission:

the real-time data is retransmitted from the base station to the communication terminal, and the non-real-time data is retransmitted from the relay station to the communication terminal, and the base station assigns the real-time data to a non-real-time data slot.

* * * * *